(12) United States Patent
Lee et al.

(10) Patent No.: US 8,275,070 B2
(45) Date of Patent: Sep. 25, 2012

(54) APPARATUS AND METHOD OF TRANSMITTING/RECEIVING SIGNALS USING SIGNALING POINT ROTATION AT MUTUAL COOPERATION TRANSMISSION

(75) Inventors: Hyojin Lee, Daejeon (KR); Hyun-Kyu Chung, Daejeon (KR); Hyun-Seok Ryu, Chungcheongbuk-do (KR); Chung-Gu Kang, Seoul (KR); Heesoo Lee, Daejeon (KR); Kyung-Mi Park, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 781 days.

(21) Appl. No.: 12/517,949

(22) PCT Filed: Dec. 6, 2007

(86) PCT No.: PCT/KR2007/006294
§ 371 (c)(1),
(2), (4) Date: Jun. 5, 2009

(87) PCT Pub. No.: WO2008/069583
PCT Pub. Date: Jun. 12, 2008

(65) Prior Publication Data
US 2010/0316165 A1 Dec. 16, 2010

(30) Foreign Application Priority Data
Dec. 6, 2006 (KR) .................. 10-2006-0123412

(51) Int. Cl.
*H04L 27/20* (2006.01)
(52) U.S. Cl. ........ 375/308; 378/341; 378/267; 378/260; 378/295; 370/315; 370/339; 370/318
(58) Field of Classification Search ............... 375/308, 375/341, 267, 260, 295; 370/315, 318, 339
See application file for complete search history.

(56) References Cited

U.S. PATENT DOCUMENTS
6,727,772 B2 * 4/2004 Kravtsov ............... 332/103
(Continued)

FOREIGN PATENT DOCUMENTS
EP 1667349 A1 6/2006
(Continued)

OTHER PUBLICATIONS
Boutros, Joseph et al., "Signal Space Diversity: A Power- and Bandwidth-Efficient Diversity Technique for the Rayleigh Fading Channel," IEEE Transactions on Information Theory, vol. 44(4):1453-1467 (1998).
Larsson, Erik G. et al., "Cooperative Transmit Diversity Based on Superposition Modulation," IEEE Communications Letters, vol. 9(9):778-780 (2005).
(Continued)

Primary Examiner — Eva Puente
(74) Attorney, Agent, or Firm — Nelson Mullins Riley & Scarborough LLP; EuiHoon Lee, Esq.

(57) ABSTRACT

An apparatus for and method of transmitting and/or receiving a signal by using signaling point rotation in mutually cooperative relaying are provided. The apparatus for transmitting a signal includes: a rotated I-channel generation unit rotating a symbol containing data of a first user, by a predetermined angle, and then, obtaining the I-channel (in-phase) component of the rotated symbol; a rotated Q-channel generation unit receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and a combining unit combining the I-channel component of the first user generated in the rotated I-channel generation unit and the Q-channel component of the second user generated in the rotated Q-channel generation unit, thereby generating one symbol.

18 Claims, 9 Drawing Sheets

U.S. PATENT DOCUMENTS

| | | | | |
|---|---|---|---|---|
| 6,795,512 | B1 | 9/2004 | Eidson et al. | |
| 7,308,036 | B2 * | 12/2007 | Sipila | 375/267 |
| 2002/0097810 | A1 * | 7/2002 | Seki | 375/295 |
| 2008/0159246 | A1 * | 7/2008 | Niemela | 370/339 |
| 2009/0034635 | A1 * | 2/2009 | Golitschek Edler Von Elbwart et al. | 375/260 |
| 2012/0033608 | A1 * | 2/2012 | Seo et al. | 370/315 |

FOREIGN PATENT DOCUMENTS

| | | |
|---|---|---|
| KR | 1020010031066 | 4/2001 |
| KR | 1020050026197 | 3/2005 |
| KR | 1020060097721 | 9/2006 |

OTHER PUBLICATIONS

Mahinthan, V. et al., "A Simple Cooperative Diversity Scheme based on Orthogonal Signaling," *IEEE Wireless Communications and Networking Conference*, vol. 2:1012-1017 (2005).

Tarasak, Poramate et al., "Differential Modulation for Two-User Cooperative Diversity Systems," IEEE Journal on Selected Areas in Communications, vol. 23(9):1891-1900 (2005).

Zafar, Md. et al., "Rectangular Co-ordinate Interleaved Orthogonal Designs," *IEEE Global Telecommunications Conference*, vol. 4:2004-2009 (2003).

* cited by examiner

APPARATUS AND METHOD OF TRANSMITTING/RECEIVING SIGNALS USING SIGNALING POINT ROTATION AT MUTUAL COOPERATION TRANSMISSION

RELATED APPLICATIONS

This application is a 35 U.S.C. §371 national stage filing of PCT Application No. PCT/KR2007/006294 filed on Dec. 6, 2007, which claims priority to, and the benefit of, Korean Patent Application No. 10-2006-0123412 filed on Dec. 6, 2006. The contents of the aforementioned applications are hereby incorporated by reference.

TECHNICAL FIELD

The present invention relates to an apparatus for and method of transmitting and/or receiving a signal by using signaling point rotation in mutually cooperative relaying, and more particularly, to an apparatus for and method of transmitting and/or receiving a signal in which two users efficiently transmit a signal in each time slot by using an orthogonal characteristic by signaling point rotation according to a mutually co-operative relaying technique for increasing a transmission rate in a relay system and improving a bit error rate (BER) performance in a destination.

This work was supported by the IT R&D program of MIC/IITA [2006-S-001-01, Development of Adaptive Radio Access and Transmission Technologies for $4^{th}$ Generation Mobile Communications].

BACKGROUND ART

A relay system environment can be broken down into a simple relay environment in which a relay simply transfers user data to a destination, and a user relay environment in which a relay transmits both user data and the relay system's data. Hereinafter, a transmission technique for mutually cooperative relaying between users in a user relay environment will be referred to as a mutually cooperative relaying (MCR) technique.

The conventional MCR techniques can be implemented in a variety of forms, and the MCR techniques that have been studied so far can be classified into three types.

The first type is an orthogonal signaling-based MCR technique (V. Mahinthan and J. W. Mark, 'A Simple Cooperative Diversity based on Orthogonal Signaling', IEEE WCNC, Vol. 2, pp. 1012-1017, March 2005). According to the method, one of two users uses the I-channel (in-phase) component of a quadrature phase shift keying (QPSK) plane in order to transmit the user's data, and the other user transmits data to be relayed by using the Q-channel (quadrature-phase) component.

However, when mutually cooperative relaying is performed by using the orthogonal signaling-based MCR technique, the transmission rate is reduced to half that of direct transmission. For example, if a user 1 can transmit 2-bit data when mutually co-operative relaying is not used (that is, in the case of direct transmission), when mutually cooperative relaying is used, the user 1 should relay data of a user 2 for mutually cooperative relaying, and therefore the user 1 can transmit only 1-bit data of his/her own.

The second type is a superposition-based MCR technique (E. G. Larsson and B. R. Vojcic, 'Cooperative Transmit Diversity based on Superposition Modulation', IEEE Communication Letters, Vol. 9, No. 9, pp. 778-780, September 2005). According to the method, each of two users combines symbols of his/her data and data to be relayed, transmits the symbols, and then, in a destination, a desired symbol is detected by using the difference between a symbol received in a current time unit and a symbol detected in the previous time unit. However, this method is greatly affected by transmission power, and in a worst case, 2 signaling points among 4 signaling points may disappear.

Finally, the third type is a space-time block code (STBC)-based MCR technique (P. Tarasak, Hlaing Minn, and V. K. Bhargava, 'Differential Modulation for Two-User co-operative Diversity systems', IEEE Comm., Vol. 23, Issue 9, pp. 1891-1900, September 2005). According to the method, the STBC is applied to the MCR technique and in order to obtain a diversity with a second order, an Alamouti's code is used. However, in order for each user to transmit one symbol, three time slots should be used in the method.

DISCLOSURE OF INVENTION

Technical Problem

The present invention provides an apparatus for and method of transmitting a signal by using signaling point rotation in mutually cooperative relaying, in which a relay transmission and reception function is implemented in a user terminal, thereby improving a reception diversity gain even without using an additional bandwidth, and increasing the transmission rate while maintaining the same quality as that of the conventional mutually cooperative relaying techniques.

The present invention provides an apparatus for and method of receiving a signal by using signaling point rotation in mutually cooperative relaying, in which a relay transmission and reception function is implemented in a user terminal, thereby improving a reception diversity gain even without using an additional bandwidth, and increasing the transmission rate while maintaining the same quality as that of the conventional mutually cooperative relaying techniques.

Technical Solution

According to an aspect of the present invention, there is provided an apparatus for transmitting a signal by using signaling point rotation in mutually cooperating relaying, the apparatus comprising: a rotated I-channel generation unit rotating a symbol containing data of a first user, by a predetermined angle, and then, obtaining the I-channel (in-phase) component of the rotated symbol; a rotated Q-channel generation unit receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and a combining unit combining the I-channel component of the first user generated in the rotated I-channel generation unit and the Q-channel component of the second user generated in the rotated Q-channel generation unit, thereby generating one symbol.

The symbol containing the data of the first user may be a quadrature phase shift keying (QPSK) symbol, and the rotated I-channel generation unit rotates the symbol containing the data of the first user by a $(½)*\tan^{-1}(2)$ angle.

The rotated I-channel generation unit may comprise: a rotation unit rotating the symbol containing the data of the first user by a predetermined angle; and a mapping unit mapping the rotated symbol to the I-channel (in-phase) component.

The rotated Q-channel generation unit may comprise: an extraction unit extracting the symbol containing the data of the second user, by detecting the I-channel component of the previous time slot, which is rotated by the predetermined angle and received from the node of the second user; and a mapping unit mapping the extracted symbol to the Q-channel (quadrature-phase) component.

The apparatus may further comprise a transmission unit transmitting the combined symbol to a destination node and the node of the second user.

The rotated I-channel generation unit may receive the symbol of the previous time slot rotated by the predetermined angle from the node of the second user, detects the Q-channel component, and obtains the I-channel (in-phase) component of the symbol containing the data of the second user from the detected Q-channel component, and the rotated Q-channel generation unit rotates the symbol containing the data of the first user by a predetermined angle, and obtains the Q-channel component of the rotated symbol, and the combining unit combines the I-channel component of the second user generated in the rotated I-channel generation unit and the Q-channel component of the first user generated in the rotated Q-channel generation unit, thereby generating one symbol.

According to another aspect of the present invention, there is provided an apparatus for receiving a signal by using signaling point rotation in mutually cooperating relaying, the apparatus comprising: a separation unit separating a symbol—obtained by combining the I-channel component of a user allocated a current time slot and the Q-channel component of another user rotated by a predetermined angle—received from the user allocated the current time slot, to the I-channel component and the Q-channel component in each time slot allocated to each user performing mutually cooperative relaying; a recombining unit recombining the Q-channel component of the current time slot and the I-channel component of the previous time slot, thereby generating a symbol related to each user; and a reverse rotation unit reversely rotating the recombined symbol by a predetermined angle, thereby generating a complete symbol related to each user.

The symbol of each user may be a QPSK symbol and the predetermined angle is $(1/2)*\tan^{-1}(2)$.

In each time slot allocated to each user, the separation unit may separate the symbol—obtained by combining the Q-channel component of the user allocated the current time slot and the I-channel component of the other user rotated by a predetermined angle—received from the user allocated the current time slot, to the I-channel component and the Q-channel component, and with the separated I-channel component and Q-channel component, the recombining unit recombines the I-channel component of the current time slot and the Q-channel component of the previous time slot, thereby generating a complete symbol related to each user.

According to another aspect of the present invention, there is provided a method of transmitting a signal by using signaling point rotation in mutually cooperating relaying, the method comprising: (a) rotating a symbol containing data of a first user, by a pre-determined angle, and then, obtaining the I-channel (in-phase) component of the rotated symbol; (b) receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and (c) combining the I-channel component of the first user generated in (a) and the Q-channel component of the second user generated in (b), thereby generating one symbol.

The symbol containing the data of the first user may be a QPSK symbol, and in (a), the symbol containing the data of the first user is rotated by a $(1/2)*\tan^{-1}(2)$ angle.

(a) may comprise: (a1) rotating the symbol containing the data of the first user by a predetermined angle; and (a2) mapping the rotated symbol to the I-channel (in-phase) component.

(b) may comprise: (b1) extracting the symbol containing the data of the second user, by detecting the I-channel component of the previous time slot, which is rotated by the predetermined angle and received from the node of the second user; and (b2) mapping the extracted symbol to the Q-channel (quadrature-phase) component.

The method may further comprise: (d) transmitting the combined symbol to a destination node and the node of the second user.

In (a), the symbol of the previous time slot rotated by the predetermined angle may be received from the node of the second user, the Q-channel component is detected, and the I-channel (in-phase) component of the symbol containing the data of the second user is obtained from the detected Q-channel component, and in (b), the symbol containing the data of the first user may be rotated by a predetermined angle, and the Q-channel component of the rotated symbol is obtained, and in (c), the generated I-channel component of the second user and the generated Q-channel component of the first user may be combined, thereby generating one symbol.

According to another aspect of the present invention, there is provided a method of receiving a signal by using signaling point rotation in mutually cooperating relaying, the method comprising: (a) separating a symbol—obtained by combining the I-channel component of a user allocated a current time slot and the Q-channel component of another user rotated by a predetermined angle—received from the user allocated the current time slot, to the I-channel component and the Q-channel component in each time slot allocated to each user performing mutually cooperative relaying; (b) re-combining the Q-channel component of the current time slot and the I-channel component of the previous time slot, thereby generating a symbol related to each user; and (c) reversely rotating the recombined symbol by a predetermined angle, thereby generating a complete symbol related to each user.

The symbol of each user may be a QPSK symbol and the predetermined angle is $(1/2)*\tan^{-1}(2)$.

In (a), in each time slot allocated to each user, the symbol—obtained by combining the Q-channel component of the user allocated the current time slot and the I-channel component of the other user rotated by a predetermined angle—received from the user allocated the current time slot may be separated to the I-channel component and the Q-channel component, and in (b), with the separated I-channel component and Q-channel component, the I-channel component of the current time slot and the Q-channel component of the previous time slot may be recombined, thereby generating a symbol related to each user.

Advantageous Effects

According to the present invention, data of both of two users can be transmitted in one time slot by using the characteristic of a rotated symbol, thereby increasing the transmission rate higher than that of the conventional cooperative relaying methods.

In addition, the I-channel component and Q-channel component of each symbol are transmitted through different channels, thereby obtaining a diversity gain and thus enhancing reliability of symbol detection in a destination node.

BEST MODE

Figure 1:
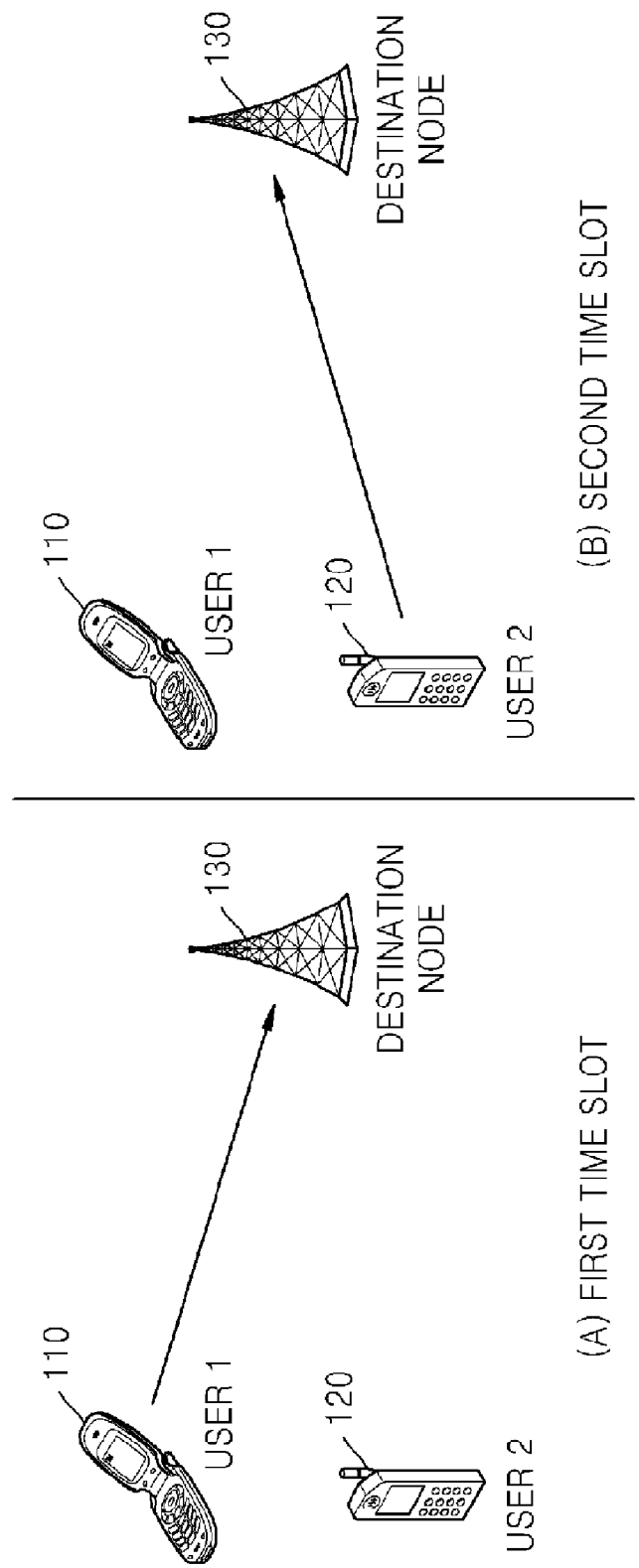
FIG. 1 is a diagram illustrating an operation in each time slot according to a direct transmission method that is an object of comparison with the present invention.

According to an aspect of the present invention, there is provided an apparatus for transmitting a signal by using signaling point rotation in mutually cooperating relaying, the apparatus comprising: a rotated I-channel generation unit rotating a symbol containing data of a first user, by a predetermined angle, and then, obtaining the I-channel (in-phase) component of the rotated symbol; a rotated Q-channel generation unit receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and a combining unit combining the I-channel component of the first user generated in the rotated I-channel generation unit and the Q-channel component of the second user generated in the rotated Q-channel generation unit, thereby generating one symbol.

According to another aspect of the present invention, there is provided an apparatus for receiving a signal by using signaling point rotation in mutually cooperating relaying, the apparatus comprising: a separation unit separating a symbol—obtained by combining the I-channel component of a user allocated a current time slot and the Q-channel component of another user rotated by a predetermined angle—received from the user allocated the current time slot, to the I-channel component and the Q-channel component in each time slot allocated to each user performing mutually cooperative relaying; a recombining unit recombining the Q-channel component of the current time slot and the I-channel component of the previous time slot, thereby generating a symbol related to each user; and a reverse rotation unit reversely rotating the recombined symbol by a predetermined angle, thereby generating a complete symbol related to each user.

According to another aspect of the present invention, there is provided a method of transmitting a signal by using signaling point rotation in mutually cooperating relaying, the method comprising: (a) rotating a symbol containing data of a first user, by a pre-determined angle, and then, obtaining the I-channel (in-phase) component of the rotated symbol; (b) receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and (c) combining the I-channel component of the first user generated in (a) and the Q-channel component of the second user generated in (b), thereby generating one symbol.

According to another aspect of the present invention, there is provided a method of receiving a signal by using signaling point rotation in mutually cooperating relaying, the method comprising: (a) separating a symbol—obtained by combining the I-channel component of a user allocated a current time slot and the Q-channel component of another user rotated by a predetermined angle—received from the user allocated the current time slot, to the I-channel component and the Q-channel component in each time slot allocated to each user performing mutually cooperative relaying; (b) re-combining the Q-channel component of the current time slot and the I-channel component of the previous time slot, thereby generating a symbol related to each user; and (c) reversely rotating the recombined symbol by a predetermined angle, thereby generating a complete symbol related to each user.

Mode for Invention

In the present invention, a signalling point is rotated and then, a symbol of a first user is divided into the I-channel component and the Q-channel component and transmitted through different users in different time slots. In this way, data of both of two users is transmitted in each time slot. Hereinafter, this transmission technique defined in the present invention will be referred to as a rotated orthogonal design (ROD) technique. Unlike the conventional mutually cooperative relaying (MCR) techniques, even when data of two users is transmitted at the same time, the ROD technique has the same transmission rate as that of direct transmission, in which only one user's data is transmitted.

The present invention will now be described more fully with reference to the accompanying drawings, in which exemplary embodiments of the invention are shown.

FIG. 1 is a diagram illustrating an operation in each time slot according to a direct transmission method that is an object of comparison with the present invention. That is, FIG. 1 illustrates an operation in an ordinary time division system that does not perform mutually cooperative relaying.

Referring to FIG. 1A, in the first time slot, a user 1 110 transmits a symbol containing the user's data, to a destination node 130. At this time, a user 2 120 waits for a time slot allocated to the user 2 120. Referring to FIG. 1B, in the second time slot, the user 2 120 transmits a symbol containing data of the user 2 120, to the destination node 130. At this time, the user 1 110 waits for a time slot allocated to the user 1 110.

In this type of transmission method, improvement of a bit error rate (BER) performance from mutually cooperative relaying cannot be expected. For comparison of the direct transmission method with the present invention, explanation on FIG. 9 can be referred to.

Figure 2:
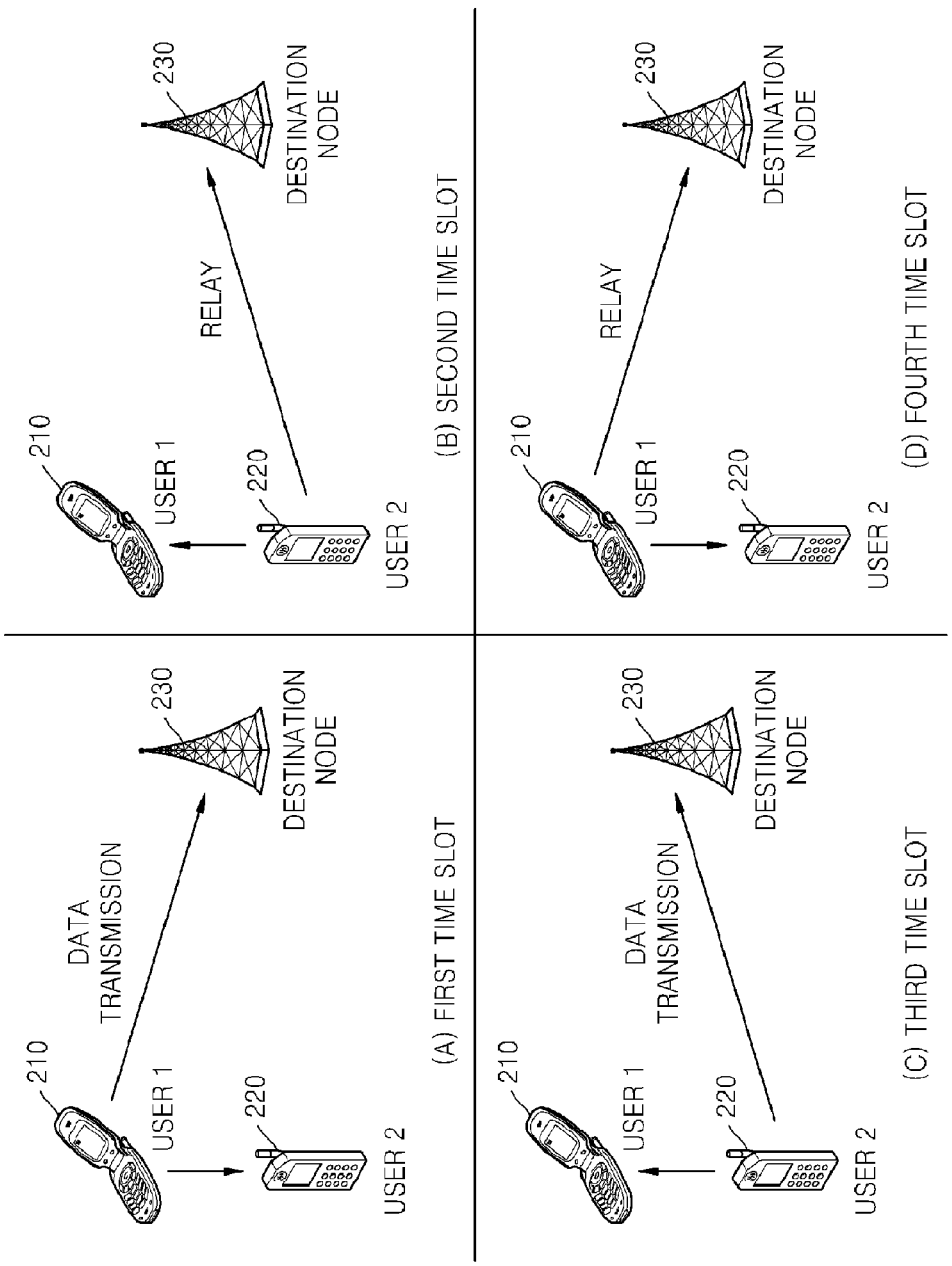
FIG. 2 is a diagram illustrating an operation in each time slot according to a time division-mutually cooperative relaying (TD-MCR) technique that is an object of comparison with the present invention.

FIG. 2 is a diagram illustrating an operation in each time slot according to a time division-mutually cooperative relaying (TD-MCR) technique that is an object of comparison with the present invention.

Referring to FIGS. 2A through 2D, according to the TD-MCR technique, each identical symbol is transmitted twice on a time axis.

More specifically, in the first time slot, a user 1 210 transmits a symbol containing data of the user 1 210, to a user 2 220 and a destination node 230. In the second time slot, the user 2 220 relays the data which is received in the previous time slot (the first time slot), to the user 1 210 and the destination node 230. In this way, transmission of the data of the user 1 210 is completed.

Then, in the third time slot, the user 2 220 transmits a symbol containing data of the user 2 220, to the user 1 210 and the destination node 230. In the fourth time slot, the user 1 210 relays the data which is received in the previous time slot (the third time slot), to the user 2 220 and the destination node 230. In this way, transmission of the data of the user 2 220 is completed.

In this type of transmission method, improvement of a BER performance from mutually cooperative relaying can be expected, but the transmission rate is substantially lowered. For comparison of the TD-MCR technique with the present invention, explanation on FIG. 9 can be referred to.

Figure 3:
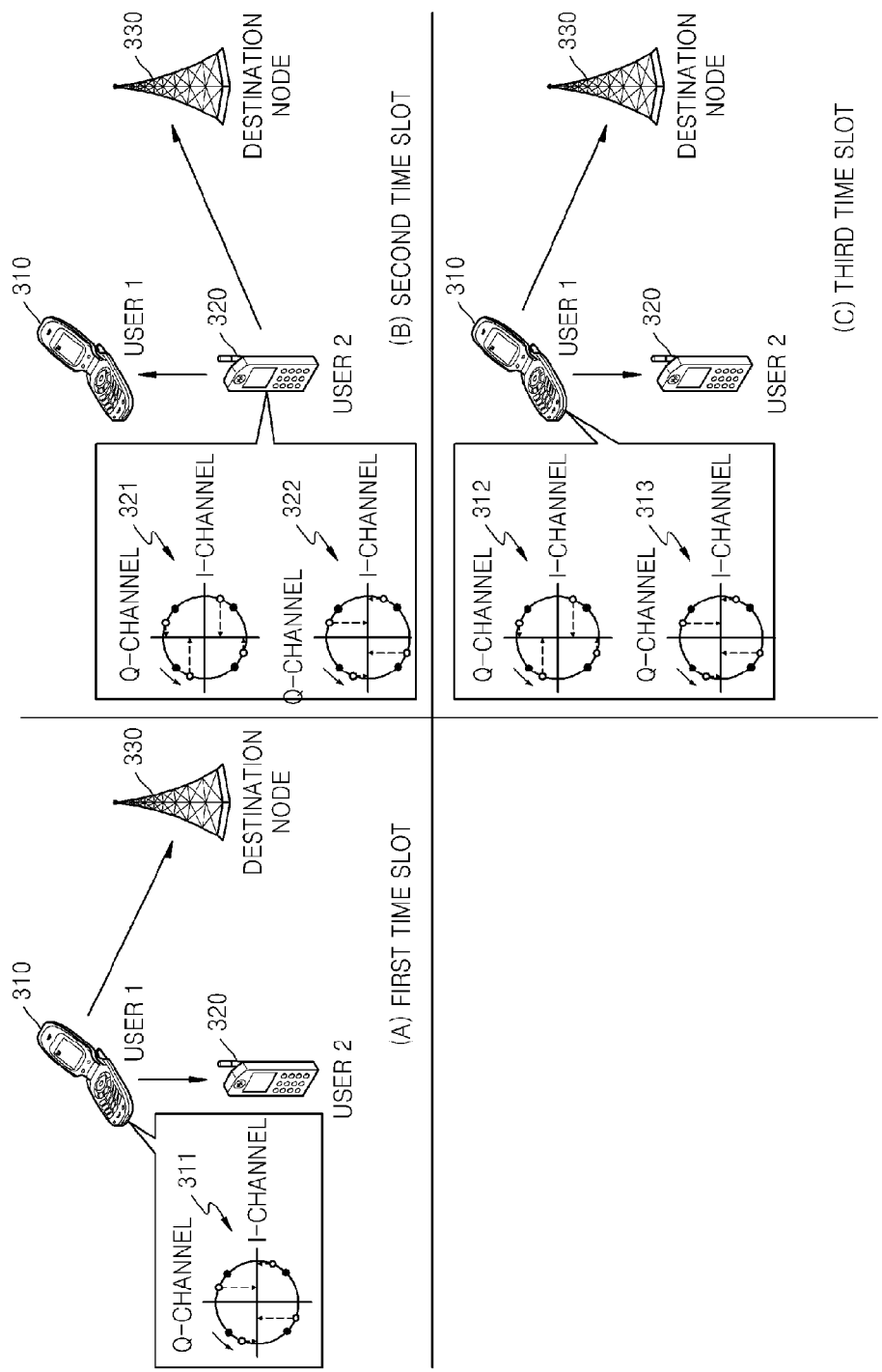
FIG. 3 is a diagram illustrating an operation in each time slot according to a transmission method of an embodiment of the present invention.

FIG. 3 is a diagram illustrating an operation in each time slot according to a transmission method of an embodiment of the present invention.

The present invention is applied to a cooperative transmission technique which is used in a user relay environment in which a relay node (station) transmits both user data and the relay node's data, not in a simple relay environment in which a relay node (station) simply relays user data.

Referring to FIG. 3A, in the first time slot, a user 1 310 transmits the I-channel (in-phase) component of a symbol which is rotated, to a user 2 320 and a destination node 330. In this case, a method of mapping the symbol by the user 1 310 to the I-channel component is shown in an I-Q plane 311.

Referring to FIG. 3B, in the second time slot, the user 2 320 detects the Q-channel (quadrature-phase) component from the I-channel component (the data of the user 1 310) of the symbol received in the first time slot. The user 2 320 combines the detected Q-channel component of the symbol with an I-channel component obtained by rotating a symbol that the user 2 320 is to transmit, thereby generating one symbol, and then, transmits the combined symbol to the user 1 310 and the destination node 330. In this case, in the destination node 330, the complete symbol of the user 1 310 is detected from the I-channel component transmitted by the user 1 310 in the first time slot and the Q-channel component transmitted by the user 2 320 in the second time slot.

In this case, a method of detecting the Q-channel component from the symbol received by the user 2 320 is shown in an I-Q plane 312, and a method of mapping the symbol rotated by the user 2 320 to the I-channel component is shown in an I-Q plane 322. Here, the I-Q plane 321 relates to the data of the user 1 310, and the I-Q plane 322 relates to the data of the user 2 320.

Referring to FIG. 3C, in the third time slot, the user 1 310 detects the Q-channel component from the I-channel component (the data of the user 2 320) of the symbol received in the second time slot. The user 1 310 combines the detected Q-channel component of the symbol with an I-channel component obtained by rotating a symbol that the user 1 310 is to transmit, thereby generating one symbol, and then, transmits the combined symbol to the user 2 320 and the destination node 330. In this case, in the destination node 330, the complete symbol of the user 2 320 is detected from the I-channel component transmitted by the user 2 320 in the second time slot and the Q-channel component transmitted by the user 1 310 in the third time slot.

In this case, a method of detecting the Q-channel component from the symbol received by the user 1 310 is shown in the I-Q plane 312, and a method of mapping the symbol rotated by the user 1 310 to the I-channel component is shown in an I-Q plane 313. Here, the I-Q plane 312 relates to the data of the user 2 320, and the I-Q plane 321 relates to the data of the user 1 310.

In the following time slots, the process described above is repeatedly performed. Accordingly, in each time slot given to a user, the user combines his/her I-channel component with the Q-channel component of the other user performing the mutually cooperative relaying.

If this is viewed from the aspect of transmitting data of one user to a destination node, the I-channel component of the data desired to be transmitted is transmitted in a time slot allocated to the user, and the Q-channel component is transmitted in a time slot allocated to another user, after being included in a symbol to be transmitted by the other user.

Meanwhile, the destination node receiving a signal by mutually cooperative relaying detects a complete symbol of each user alternately by using a symbol of a current time slot and a symbol of a previous time slot in each time slot. That is, if a complete symbol from one user is obtained from an N-th symbol and an (N-1)-th symbol in an N-th time slot, a complete symbol from the other user is obtained from an N-th symbol and an (N+1)-th symbol in an (N+1)-th time slot.

Figure 4:
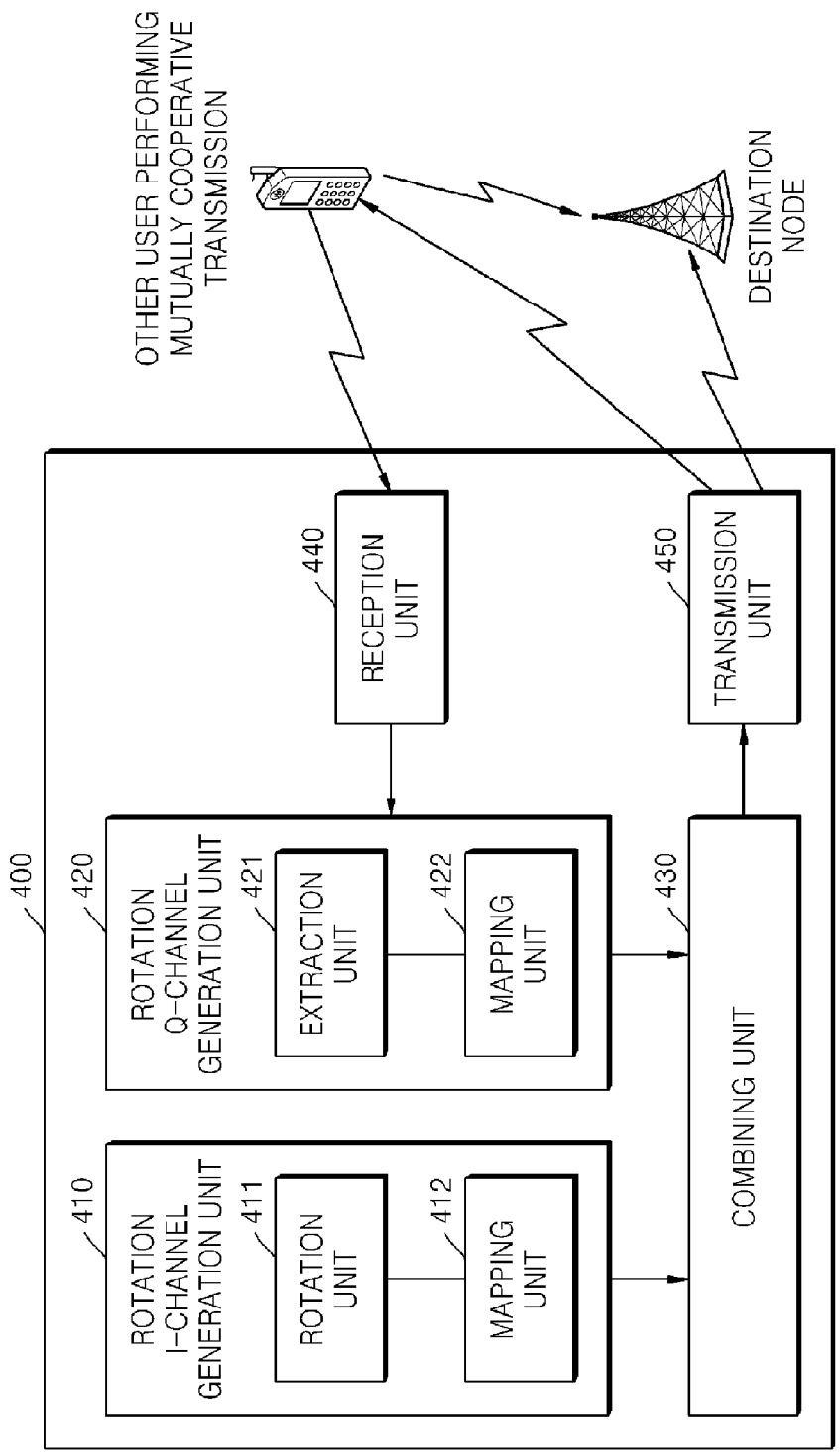
FIG. 4 is a diagram illustrating a structure of an apparatus for transmitting a signal by using signaling point rotation in mutually cooperative relaying according to an embodiment of the present invention.

FIG. 4 is a diagram illustrating a structure of an apparatus for transmitting a signal by using signaling point rotation in mutually cooperative relaying according to an embodiment of the present invention.

Referring to FIG. 4, the apparatus 400 for transmitting a signal by using signaling point rotation according to the current embodiment is disposed generally in a user terminal of mutually cooperative relaying, and is composed of a rotated I-channel generation unit 410, a rotated Q-channel generation unit 420, and a combining unit 430.

More specifically, the rotated I-channel generation unit 410 rotates a symbol containing data of a user by a predetermined angle, and then, obtains the I-channel (in-phase) component of the rotated symbol.

In the case where the symbol containing the user data is a quadrature phase shift keying (QPSK) symbol, the rotated I-channel generation unit 410 may rotate the symbol containing the user data by a $(\frac{1}{2})*\tan^{-1}(2)$ angle (approximately 31.7°).

In this way, the present invention provides the orthogonal characteristic by rotation, without causing a problem that when a symbol is mapped to the I-channel or Q-channel, signaling points overlap each other, and thus cannot be distinguished from each other. For example, if a symbol expressed as 45° and a symbol expressed as −45° are mapped to the I-channel components, and if the mapping is performed without rotation, the two symbols cannot be distinguished without the Q-channel components. Meanwhile, in the case of rotated symbols, the symbols can be distinguished even without the Q-channels, as shown in the I-Q planes illustrated in FIG. 3. Accordingly, the Q-channel components can be extracted from the I-channel components.

The rotated I-channel generation unit 410 may include a rotation unit 411 rotating a symbol containing data of a user by a predetermined angle, and a mapping unit 412 mapping the rotated symbol to the I-channel component.

The rotated Q-channel generation unit 420 receives a symbol rotated by a pre-determined angle, of a previous time slot from a node of another user performing mutually cooperative relaying with the current user, detects the I-channel component, and obtains the Q-channel (quadrature-phase) component. The symbol of the other user received through a reception unit 440 is obtained by rotating the symbol in the rotated I-channel generation unit (not 410, not shown) included in the node of the other user, and mapping the rotated symbol to the I-channel component in the previous time slot. Accordingly, as described above, the Q-channel component of the symbol containing the data of the other user can be obtained from the detected I-channel component.

The rotated Q-channel generation unit 420 may include an extraction unit 421 extracting the symbol containing the data of the other user, by detecting the I-channel component of the previous time slot, which is rotated by the predetermined angle and received from the node of the other user, and a mapping unit 422 mapping the extracted symbol to the Q-channel component.

The combining unit 430 combines the I-channel component of the current user generated in the rotated I-channel generation unit 410 with the Q-channel component of the other user generated in the rotated Q-channel generation unit 420, thereby generating one symbol.

If the symbol combining the data of the two users performing mutually cooperative relaying is generated in the combining unit 430 in this way, a transmission unit 450 transmits the combined symbol to the node of the other user and a destination node.

The apparatus according to the current embodiment applies the data of the current user to the I-channel and the data of the other user to the Q-channel, as described above. However, a person skilled in the art can understand that the apparatus can also apply the data of the current user to the Q-channel and the data of the other user to the I-channel.

In such case, the roles of the rotated I-channel generation unit and the rotated Q-channel generation unit will be exchanged. That is, the rotated I-channel generation unit receives a symbol rotated by a predetermined angle in a previous time slot from the node of the other user, detects the Q-channel component, and obtains the I-channel component of the symbol containing the data of the other user, from the detected Q-channel component. The rotated Q-channel generation unit rotates a symbol containing data of the current user by a predetermined angle, and then, obtains the Q-channel component of the rotated symbol. Also, the combining unit combines the I-channel component of the other user generated in the rotated I-channel generation unit and the Q-channel component of the current user generated in the rotated Q-channel generation unit, thereby generating one symbol. The reception unit should be connected to the rotated I-channel generation unit, instead of the rotated Q-channel generation unit.

Figure 5:
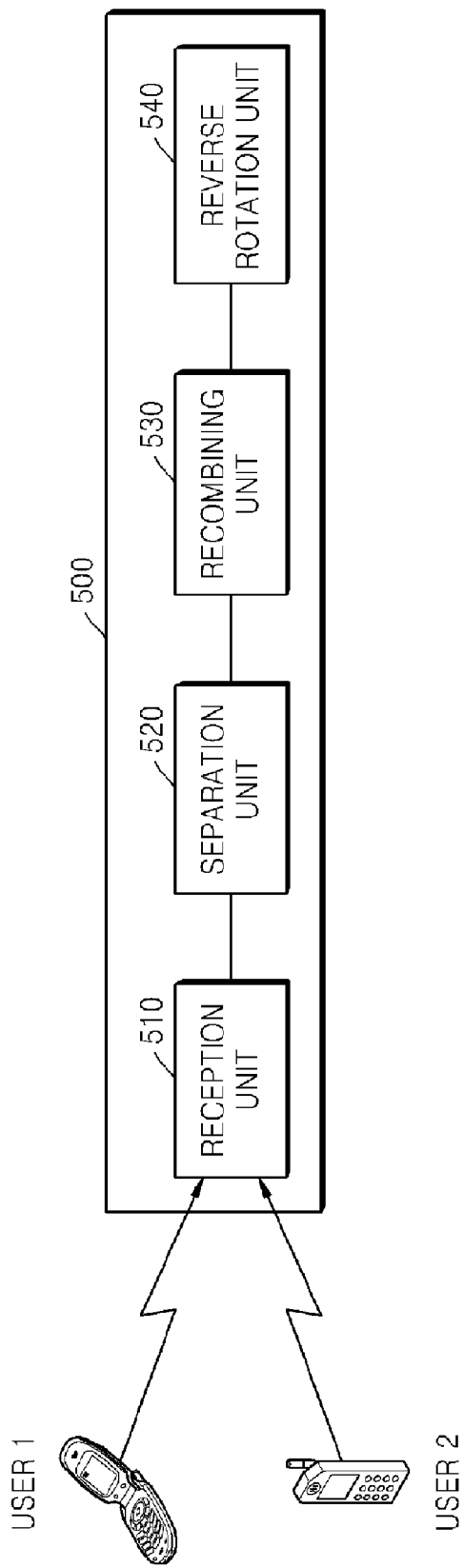
FIG. 5 is a diagram illustrating a structure of an apparatus for receiving a signal by using signaling point rotation in mutually cooperative relaying according to another embodiment of the present invention.

FIG. 5 is a diagram illustrating a structure of an apparatus for receiving a signal by using signaling point rotation in mutually cooperative relaying according to another embodiment of the present invention.

Referring to FIG. 5, the apparatus 500 for receiving a signal by using signaling point rotation according to the current embodiment is disposed generally in a relay or a device in a base station performing mutually cooperative relaying, and is composed of a separation unit 520, a recombining unit 530, and a reverse rotation unit 540.

More specifically, in each time slot allocated to each user performing mutually co-operative relaying, the separation unit 520 separates a symbol received through the reception unit 510 from a user allocated a current time slot, to the I-channel component and the Q-channel component. As described above with reference to FIG. 4, this symbol is obtained by combining the I-channel component of the user allocated the current time slot and the Q-channel component of the other user rotated by a pre-determined angle.

A symbol of each user is a QPSK symbol and the predetermined angle is $(\frac{1}{2})*\tan^{-1}(2)$.

With the I-channel component and the Q-channel component separated in this way, the recombining unit 530 recombines the Q-channel component of the current time slot with the I-channel component of the previous time slot, thereby generating a symbol related to each user. In this way, in each two time slots, a complete symbol of each user is detected alternately from a symbol of a current time slot and a symbol of a previous time slot, in each time slot. For example, if a complete symbol related to a user 1 is obtained from an N-th symbol and an (N-1)-th symbol in an N-th time slot, a complete symbol related to a user 2 is obtained from an N-th symbol and an (N+1)-th symbol in an (N+1)-th time slot.

The reverse rotation unit 540 reversely rotates the recombined symbol by a pre-determined angle, thereby generating a complete symbol related to each user. Since the symbol generated in the recombining unit 530 is a symbol in a rotated state, the symbol is reversely rotated by the angle by which the symbol is rotated in a transmission apparatus, thereby obtaining the original symbol. Though the symbol is reversely rotated after the recombining unit 530, the symbol may be reversely rotated after the separation unit 520, and then, recombined. This can be easily understood by a person skilled in the art.

The apparatus according to the current embodiment receives a symbol in which the data of the current user is applied to the I-channel and the data of the other user is applied to the Q-channel, as described above with reference to FIG. 5.

However, a person skilled in the art can understand that the apparatus according to the current embodiment can also be applied when the data of the current user is applied to the Q-channel and the data of the other user is applied to the I-channel.

In such case, in each time slot allocated to each user, the separation unit separates a symbol (obtained by combining the Q-channel component of the user allocated the current time slot and the I-channel component of the other user rotated by a pre-determined angle) received from a user allocated the current time slot, to the I-channel component and the Q-channel component.

With the separated I-channel component and Q-channel component, the recombining unit recombines the I-channel component of the current time slot with the Q-channel component of the previous time slot, thereby generating a symbol related to each user.

Figure 6:
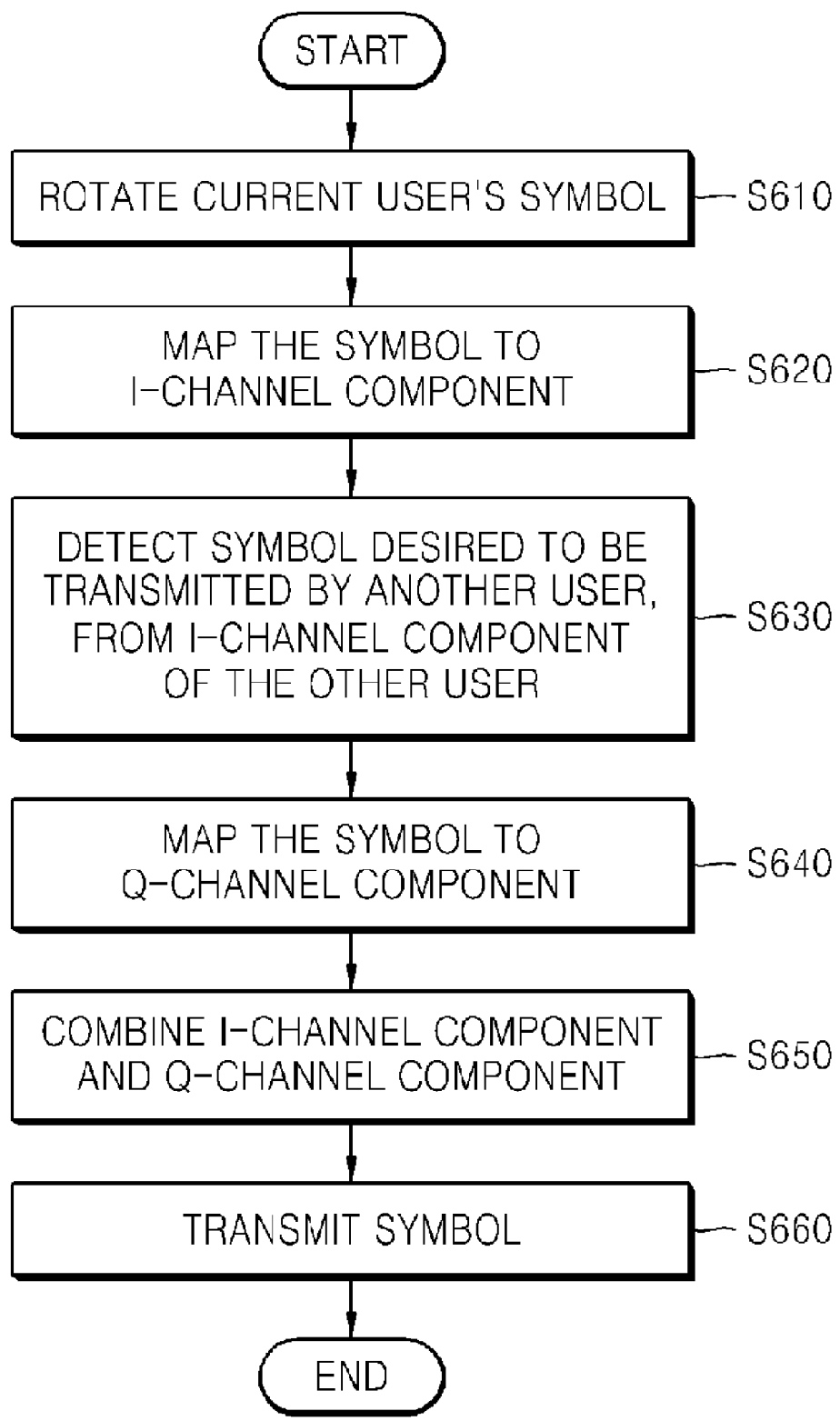
FIG. 6 is a flowchart of a method of transmitting a signal by using signaling point rotation in mutually cooperative relaying according to another embodiment of the present invention.

FIG. 6 is a flowchart of a method of transmitting a signal by using signaling point rotation in mutually cooperative relaying according to another embodiment of the present invention. In the explanation of FIG. 6, the explanation of FIG. 4 can be referred to for further details.

Referring to FIGS. 4 and 6, first, a symbol containing data of a user is rotated by a predetermined angle in the rotation unit 411 in operation S610. Then, the rotated symbol is mapped to the I-channel component in the mapping unit 412 in operation S620.

If the symbol containing the data of the user is a QPSK symbol, the rotated I-channel generation unit 410 may rotate the symbol containing the data of the user by a $(1/2)*\tan^{-1}(2)$ angle (approximately 31.7°).

Next, the extraction unit 421 detects the I-channel component from a symbol of the previous time slot, which is rotated by a predetermined angle and received from the node of the other user, and extracts the symbol containing the data of the other user in operation S630. Then, the mapping unit 422 maps the extracted symbol to the Q-channel component in operation S640.

Next, the combining unit 430 combines the I-channel component of the current user generated in the rotated I-channel generation unit 410 with the Q-channel component of the other user generated in the rotated Q-channel generation unit 420, thereby generating one symbol in operation S650. Then, the transmission unit 450 transmits the combined symbol to the node of the other user and the destination node in operation S660.

Figure 7:
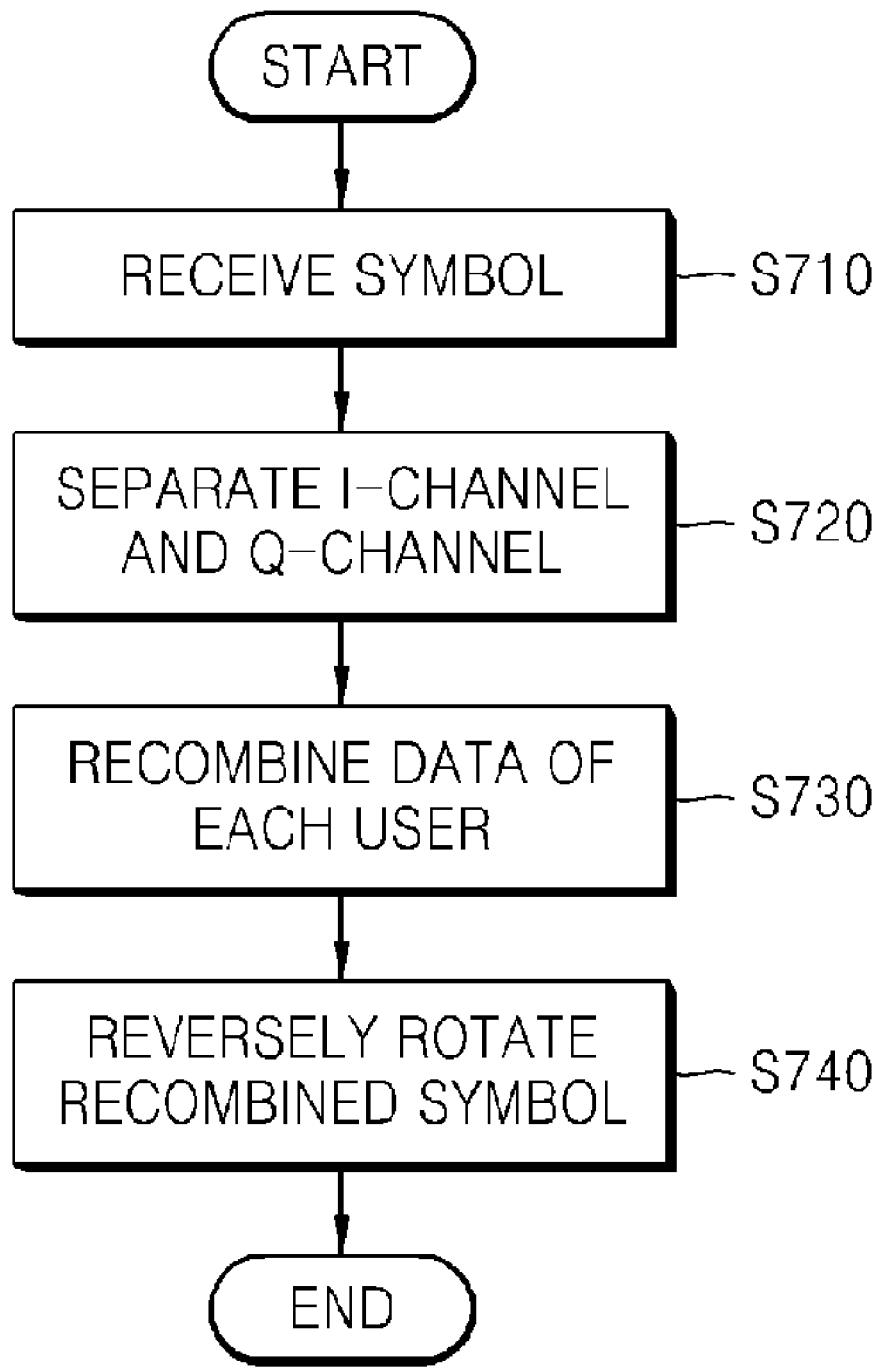
FIG. 7 is a flowchart of a method of receiving a signal by using signaling point rotation in mutually cooperative relaying according to another embodiment of the present invention.

FIG. 7 is a flowchart of a method of receiving a signal by using signaling point rotation in mutually cooperative relaying according to another embodiment of the present invention. In the explanation of FIG. 7, the explanation of FIG. 5 can be referred to for further details.

Referring to FIGS. 5 and 7, first, a symbol obtained by combining the I-channel component of the user allocated the current time slot and the Q-channel component of the other user rotated by a predetermined angle is received in operation S710. In this case, in each time slot allocated to each user performing mutually cooperative relaying, the separation unit 520 separates a symbol received through the reception unit 510 from a user allocated a current time slot, to the I-channel component and the Q-channel component in operation S720.

A symbol of each user may be a QPSK symbol and the predetermined angle may be $(½)*\tan^{-1}(2)$.

Next, with the I-channel component and the Q-channel component separated in this way, the recombining unit 530 recombines the Q-channel component of the current time slot with the I-channel component of the previous time slot, thereby generating a symbol related to each user in operation S730.

Finally, the reverse rotation unit 540 reversely rotates the recombined symbol by a predetermined angle, thereby generating a complete symbol of each user in operation S740.

Figure 8:
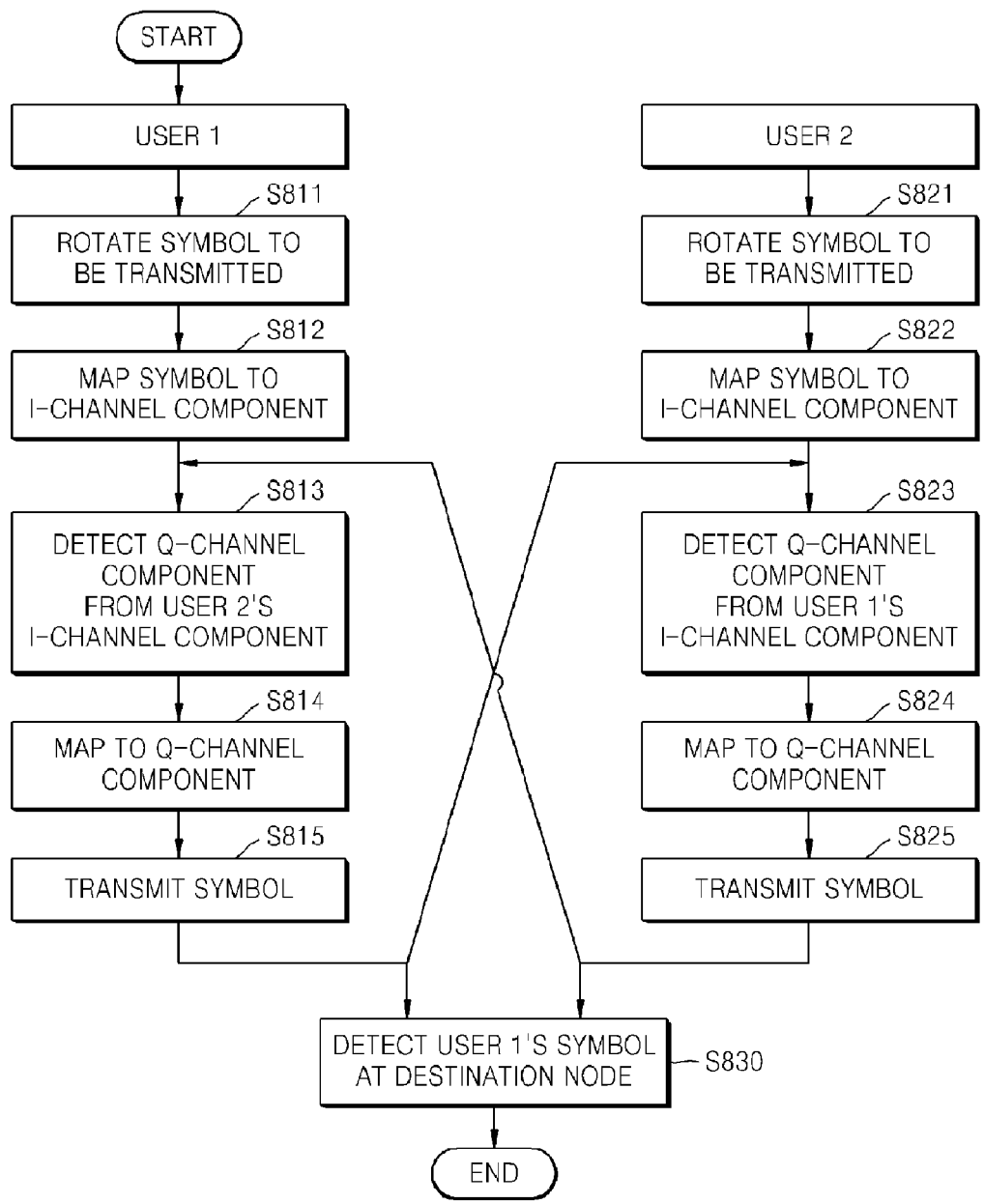
FIG. 8 is a flowchart of a method of mutually cooperative relaying based on a rotated orthogonal design (ROD) according to another embodiment of the present invention which is seen from both viewpoints of two users.

FIG. 8 is a flowchart of a method of ROD-based mutually cooperative relaying according to another embodiment of the present invention which is seen from both viewpoints of two users.

Referring to FIG. 8, first, a method of transmitting a signal by a user 1 in a first time slot will now be explained.

In operation S811, the user 1 rotates a symbol (data of the user 1) to be transmitted.

Then, in operation S812, the user 1 maps the rotated symbol (the data of the user 1) to the I-channel component of a symbol to be transmitted in a first time slot.

In operation S813, the user 1 detects the Q-channel component (data of user 2) from the I-channel component (data of user 2) of a symbol received from the user 2 in the previous time slot. In operation S814, the user 1 maps the Q-channel component detected in operation S813 to the Q-channel of a symbol to be transmitted in the first time slot.

In operation S815, the user 1 transmits the symbol mapped to the I-channel in operation S812 and the Q-channel in operation S814, to the user 2 and the destination node in the first time slot. In this way, the transmission by the user 1 in the first time slot is completed.

A method of transmitting a signal by the user 2 in the second time slot will now be explained.

In operation S821, the user 2 rotates a symbol (data of user 2) to be transmitted.

Next, in operation S822, the user 2 maps the symbol (data of user 2) rotated in operation S821 to the I-channel component of a symbol to be transmitted in the second time slot.

In operation S823, the user 2 detects the Q-channel (data of user 1) from the I-channel component (data of user 1) of the symbol received from the user 1 in operation S815. Then, in operation S824, the Q-channel component detected in operation S823 is mapped to the Q-channel of the symbol to be transmitted by the user 2 in the second time slot.

Then, in operation S825, the user 2 transmits the symbol mapped to the I-channel in operation S822 and to the Q-channel in operation S824, to the user 1 and the destination node. In this way, transmission by the user 2 in the second time slot is completed.

In operation S830, a symbol related to each user is detected from the symbols received by the destination node. This will now be explained in detail.

In the destination node, the symbol of the user 1 (data of user 1) is detected from the I-channel of the symbol received in operation S815 and the Q-channel of the symbol received in operation S825. Since an example related to the first and second time slots is explained with reference to FIG. 8, the symbol containing the data of the user 1 is detected. However, if in the second and third time slots, the user 1 and the user 2 transmit symbols to the destination node in the same manner, and in the destination node symbols are detected in each two time slots, the symbol containing the data of the user 2 is detected. In this way, data of the user 1 and data of the user 2 are detected alternately in each time slot.

With reference to FIGS. 6 through 8, the embodiments in which data of the current user is applied to the I-channel and the data of the other user is applied to the Q-channel are described above. However, a person skilled in the art can understand that the data of the current user can be applied to the Q-channel and the data of the other user can be applied to the I-channel.

In this case, the roles of the operation for generating or detecting the I-channel and the operation for generating or detecting the Q-channel should be exchanged appropriately when necessary.

According to the present invention, when two users use a ROD-based MCR technique, though two users transmit data at the same time, the transmission rate is the same as that of the direct transmission method in which only data of one user is transmitted. Also, an additional diversity gain is obtained and a transmission rate higher than that of the conventional MCR techniques is achieved.

Figure 9A:
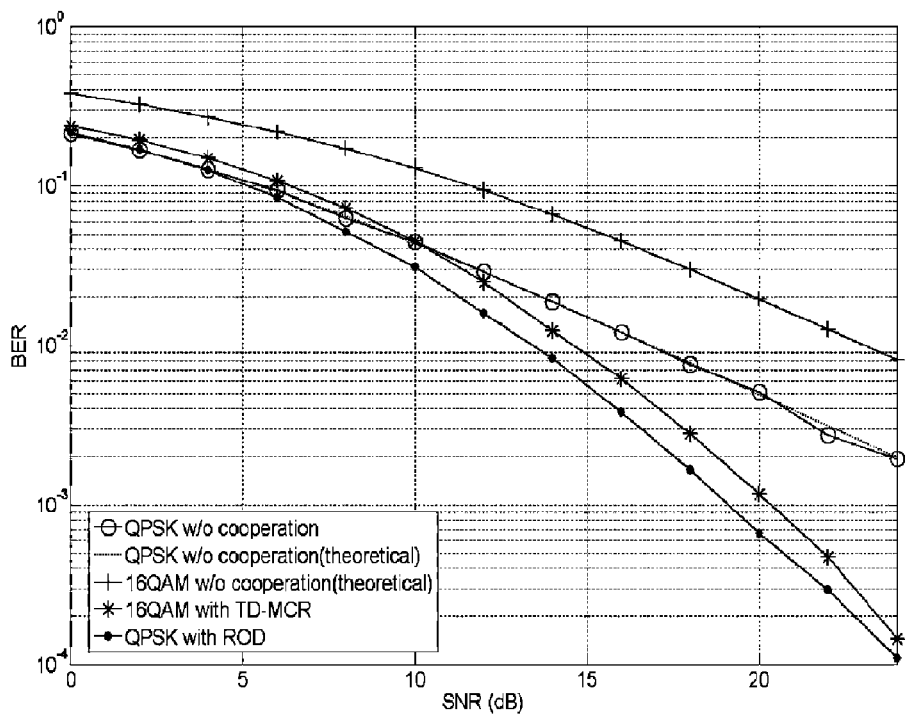
FIG. 9A is a diagram comparing performances obtained when a direction transmission method and a TD-MCR technique that are objects of comparison with the present invention are used, with the performance of the present invention.

FIG. 9A is a diagram comparing performances obtained when a direction transmission method and a TD-MCR technique that are objects of comparison with the present invention are used, with the performance of the present invention.

FIG. 9A shows the result of simulation on the assumption that a signal-to-noise ratio (SNR) from each user to a destination node (U1->D, U2->D) is identical and the channels between users (U1->U2, U2->U1) are ideal.

In the simulation, QPSK was used for the direct transmission method (no mutually cooperative relaying). In the case of the TD-MCR technique, in order to make the TD-MCR technique have the same transmission rate as that of the present invention, quadrature amplitude modulation (QAM) was used, and a symbol received in two time slots in the destination node was combined in a maximum ratio (maximal ratio combining, MRC).

Referring to FIG. 9A, when the channels between the users are ideal, that is, when an error does not occur when each user detects a symbol, the present invention has a gain of 3~4 dB in a target BER compared to the direct transmission method, and a gain of 1~2 dB in a target BER compared to the TD-MCR technique.

Figure 9B:
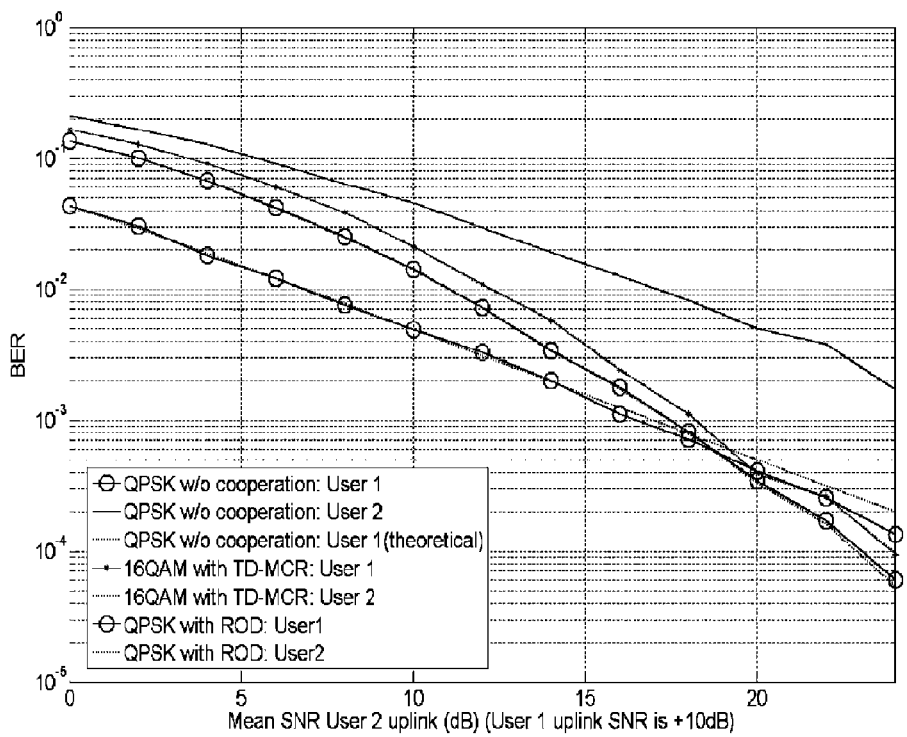
FIG. 9B is a diagram comparing the performance obtained when a direct transmission that is an object of comparison with the present invention is used, with the performance of the present invention.

FIG. 9B is a diagram comparing the performance obtained when a direct transmission that is an object of comparison with the present invention is used, with the performance of the present invention.

FIG. 9B shows the result of simulation performed when the SNR of the user 1 and the destination node (U1->D) is 10 dB better than the SNR of the user 2 and the destination node (U2->D) and the SNR between users (U1->U2, U2->U1).

Referring to FIG. 9B, the user 2 having a relatively poor channel state obtained a high SNR through mutually cooperative relaying with the user 1, and achieved a gain compared to the direct transmission. The user 1 having a good channel state experienced an SNR loss in a target BER by performing mutually cooperative relaying with the user 2 having a poor channel state. However, if a viewpoint of fairness of all users in a wireless communication network environment is considered, the result can be regarded as desirable.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for transmitting a signal by using signaling point rotation in mutually cooperating relaying, the apparatus comprising:

a rotated I-channel generation unit rotating a symbol containing data of a first user, by a predetermined angle, and then, obtaining the I-channel (in-phase) component of the rotated symbol;

a rotated Q-channel generation unit receiving a symbol rotated by a pre-determined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and a combining unit combining the I-channel component of the first user generated in the rotated I-channel generation unit and the Q-channel component of the second user generated in the rotated Q-channel generation unit, thereby generating one symbol.

2. The apparatus of claim 1, wherein the symbol containing the data of the first user is a quadrature phase shift keying (QPSK) symbol, and the rotated I-channel generation unit rotates the symbol containing the data of the first user by a $(1/2)*\tan^{-1}(2)$ angle.

3. The apparatus of claim 1, wherein the rotated I-channel generation unit comprises:

a rotation unit rotating the symbol containing the data of the first user by a pre-determined angle; and a mapping unit mapping the rotated symbol to the I-channel (in-phase) component.

4. The apparatus of claim 1, wherein the rotated Q-channel generation unit comprises:

an extraction unit extracting the symbol containing the data of the second user, by detecting the I-channel component of the previous time slot, which is rotated by the predetermined angle and received from the node of the second user; and a mapping unit mapping the extracted symbol to the Q-channel (quadrature-phase) component.

5. The apparatus of claim 1, further comprising a transmission unit transmitting the combined symbol to a destination node and the node of the second user.

6. The apparatus of claim 1, wherein the rotated I-channel generation unit receives the symbol of the previous time slot rotated by the predetermined angle from the node of the second user, detects the Q-channel component, and obtains the I-channel (in-phase) component of the symbol containing the data of the second user from the detected Q-channel component, and the rotated Q-channel generation unit rotates the symbol containing the data of the first user by a predetermined angle, and obtains the Q-channel component of the rotated symbol, and the combining unit combines the I-channel component of the second user generated in the rotated I-channel generation unit and the Q-channel component of the first user generated in the rotated Q-channel generation unit, thereby generating one symbol.

7. An apparatus for receiving a signal by using signaling point rotation in mutually cooperating relaying, the apparatus comprising:

a separation unit separating a symbol—obtained by combining the I-channel component of a user allocated a current time slot and the Q-channel component of another user rotated by a predetermined angle —received from the user allocated the current time slot, to the I-channel component and the Q-channel component in each time slot allocated to each user performing mutually co-operative relaying;

a recombining unit recombining the Q-channel component of the current time slot and the I-channel component of the previous time slot, thereby generating a symbol related to each user; and a reverse rotation unit reversely rotating the recombined symbol by a pre-determined angle, thereby generating a complete symbol related to each user.

8. The apparatus of claim 7, wherein the symbol of each user is a QPSK symbol and the predetermined angle is $(½)*\tan^{-1}(2)$.

9. The apparatus of claim 7, wherein in each time slot allocated to each user, the separation unit separates the symbol—obtained by combining the Q-channel component of the user allocated the current time slot and the I-channel component of the other user rotated by a predetermined angle—received from the user allocated the current time slot, to the I-channel component and the Q-channel component, and with the separated I-channel component and Q-channel component, the recombining unit recombines the I-channel component of the current time slot and the Q-channel component of the previous time slot, thereby generating a complete symbol related to each user.

10. A method of transmitting a signal by using signaling point rotation in mutually cooperating relaying, the method comprising:

(a) rotating a symbol containing data of a first user, by a predetermined angle, and then, obtaining the I-channel (in-phase) component of the rotated symbol;

(b) receiving a symbol rotated by a predetermined angle, of a previous time slot from a node of a second user performing mutually cooperative relaying with the node of the first user, detecting the I-channel component, and obtaining the Q-channel (quadrature-phase) component of a symbol containing data of the second user from the detected I-channel component; and (c) combining the I-channel component of the first user generated in (a) and the Q-channel component of the second user generated in (b), thereby generating one symbol.

11. The method of claim 10, wherein the symbol containing the data of the first user is a QPSK symbol, and in (a), the symbol containing the data of the first user is rotated by a $(½)*\tan^{-1}(2)$ angle.

12. The method of claim 10, wherein (a) comprises:

(a1) rotating the symbol containing the data of the first user by a predetermined angle; and (a2) mapping the rotated symbol to the I-channel (in-phase) component.

13. The method of claim 10, wherein (b) comprises:

(b1) extracting the symbol containing the data of the second user, by detecting the I-channel component of the previous time slot, which is rotated by the pre-determined angle and received from the node of the second user; and (b2) mapping the extracted symbol to the Q-channel (quadrature-phase) component.

14. The method of claim 10, further comprising (d) transmitting the combined symbol to a destination node and the node of the second user.

15. The method of claim 10, wherein in (a), the symbol of the previous time slot rotated by the predetermined angle is received from the node of the second user, the Q-channel component is detected, and the I-channel (in-phase) component of the symbol containing the data of the second user is obtained from the detected Q-channel component, and in (b), the symbol containing the data of the first user is rotated by a pre-determined angle, and the Q-channel component of the rotated symbol is obtained, and in (c), the generated I-channel component of the second user and the generated Q-channel component of the first user are combined, thereby generating one symbol.

16. A method of receiving a signal by using signaling point rotation in mutually co-operating relaying, the method comprising:

(a) separating a symbol—obtained by combining the I-channel component of a user allocated a current time slot and the Q-channel component of another user rotated by a predetermined angle—received from the user allocated the current time slot, to the I-channel component and the Q-channel component in each time slot allocated to each user performing mutually cooperative relaying;

(b) recombining the Q-channel component of the current time slot and the I-channel component of the previous time slot, thereby generating a symbol related to each user; and (c) reversely rotating the recombined symbol by a predetermined angle, thereby generating a complete symbol related to each user.

17. The method of claim 16, wherein the symbol of each user is a QPSK symbol and the predetermined angle is $(½)*\tan^{-1}(2)$.

18. The method of claim 16, wherein in (a), in each time slot allocated to each user, the symbol—obtained by combining the Q-channel component of the user allocated the current time slot and the I-channel component of the other user rotated by a predetermined angle—received from the user allocated the current time slot is separated to the I-channel component and the Q-channel component, and in (b), with the separated I-channel component and Q-channel component, the I-channel component of the current time slot and the Q-channel component of the previous time slot are recombined, thereby generating a symbol related to each user.

* * * * *